United States Patent
Choi

(10) Patent No.: US 11,908,210 B2
(45) Date of Patent: Feb. 20, 2024

(54) METHOD AND APPARATUS FOR DETECTING OBJECT IN THREE-DIMENSIONAL (3D) POINT CLOUD

(71) Applicant: Meissa Inc., Seoul (KR)

(72) Inventor: Suk Won Choi, Suncheon (KR)

(73) Assignee: Meissa Inc., Seoul (KR)

( * ) Notice: Subject to any disclaimer, the term of this patent is extended or adjusted under 35 U.S.C. 154(b) by 281 days.

(21) Appl. No.: 17/193,558

(22) Filed: Mar. 5, 2021

(65) Prior Publication Data

US 2021/0279443 A1   Sep. 9, 2021

(30) Foreign Application Priority Data

Mar. 6, 2020   (KR) .......................... 10-2020-0028152

(51) Int. Cl.
*G06V 20/64*   (2022.01)
*G06T 7/62*   (2017.01)
(Continued)

(52) U.S. Cl.
CPC .............. *G06V 20/647* (2022.01); *G06T 7/62* (2017.01); *G06T 7/75* (2017.01); *G06T 17/10* (2013.01);
(Continued)

(58) Field of Classification Search
CPC .... G06V 20/647; G06V 20/13; G06V 20/188; G06V 20/653; G06T 7/62; G06T 7/75;
(Continued)

(56) References Cited

U.S. PATENT DOCUMENTS

| 8,103,128 B2 * | 1/2012 | Aonuma ................. A63F 13/45 |
| | | 345/474 |
| 2017/0229022 A1 | 8/2017 | Gurel et al. |
| 2019/0026531 A1* | 1/2019 | Alvarez Gonzalez ...................... |
| | | G06F 18/23213 |

FOREIGN PATENT DOCUMENTS

KR   10-1899549 B1   9/2018

OTHER PUBLICATIONS

Navaneet, K.L., Mandikal, P., Agarwal, M. and Babu, R.V., Jul. 2019, Capnet: Continuous approximation projection for 3d point cloud reconstruction using 2d supervision. In Proceedings of the AAAI Conference on Artificial Intelligence (vol. 33, No. 01, pp. 8819-8826).*

(Continued)

*Primary Examiner* — Zhitong Chen
(74) *Attorney, Agent, or Firm* — Studebaker & Brackett PC

(57) ABSTRACT

A method and apparatus for detecting an object in a three-dimensional (3D) point cloud are disclosed. The apparatus includes a three-dimensional (3D) model reconstruction unit configured to reconstruct a three-dimensional (3D) model using three-dimensional (3D) point cloud data, a two-dimensional (2D) object detection unit configured to detect an object in at least one two-dimensional (2D) image captured to generate the three-dimensional (3D) point cloud data, a three-dimensional (3D) position estimation unit configured to form a cylinder surrounding the object in the three-dimensional (3D) model based on a two-dimensional (2D) position of the detected object so as to estimate a three-dimensional (3D) position of the detected object using the cylinder, and an object region extraction unit configured to acquire three-dimensional (3D) point cloud data contained (Continued)

in the cylinder so as to extract an object region from the acquired three-dimensional (3D) point cloud data.

7 Claims, 5 Drawing Sheets

(51) Int. Cl.
  *G06T 7/73* (2017.01)
  *G06T 17/10* (2006.01)
  *G06V 20/13* (2022.01)
  *G06V 20/10* (2022.01)
(52) U.S. Cl.
  CPC .... *G06V 20/13* (2022.01); *G06T 2207/10028* (2013.01); *G06V 20/188* (2022.01)
(58) Field of Classification Search
  CPC ........... G06T 17/10; G06T 2207/10028; G06T 17/20; G06T 7/11
  See application file for complete search history.

(56) References Cited

OTHER PUBLICATIONS

Han, K.K. and Golparvar-Fard, M., 2015. Appearance-based material classification for monitoring of operation-level construction progress using 4D BIM and site photologs. Automation in construction, 53, pp. 44-57.*
Office Action issued in KR 10-2020-0028152; issued by the Korean Intellectual Property Office dated Dec. 24, 2020.

* cited by examiner

US 11,908,210 B2

METHOD AND APPARATUS FOR DETECTING OBJECT IN THREE-DIMENSIONAL (3D) POINT CLOUD

CROSS-REFERENCE TO RELATED APPLICATION

This application claims the benefit of Korean Patent Application No. 10-2020-0028152, filed on Mar. 6, 2020, which is hereby incorporated by reference as if fully set forth herein.

BACKGROUND

1. Field of the Invention

The present disclosure relates to a method and apparatus for detecting an object in a three-dimensional (3D) point cloud, and more particularly to a method and apparatus for detecting an object in a three-dimensional (3D) point cloud, which can detect an object in a three-dimensional (3D) model reconstructed using the 3D point cloud.

2. Description of Related Art

Three-dimensional (3D) reconstruction technology, which can generate three-dimensional (3D) point cloud data based on two-dimensional (2D) aerial images captured by a drone and can construct a three-dimensional (3D) model using the 3D point cloud data, has been developed and is commercially available.

3D reconstruction technology has been widely used in various fields, for example, medicine, film (movie) industry, robotics, city planning, virtual environment, earth observation, archaeology, augmented reality (AR), human-computer interaction (HCI), etc.

However, 3D object detection technology capable of detecting a desired object in a constructed 3D model has not yet reached commercialization.

In particular, there has recently been an attempt to manage raw materials of a construction site with a three-dimensional (3D) model generated through aerial surveying in the field of construction. Although the 3D object detection technology has usually been developed based on the ability to calculate a volume of a specific region, the 3D object detection technology has disadvantages in that a user has difficulty in easily using the 3D object detection technology because the user should manually select and input not only a region of each raw material but also types of constituent materials (e.g., iron ore, cement, wood, etc.) constructing the corresponding raw materials.

Thus, there is needed a method for automatically detecting an object in a 3D model.

SUMMARY OF THE INVENTION

Accordingly, the present disclosure is directed to a method and apparatus for detecting an object in a three-dimensional (3D) point cloud that substantially obviate one or more problems due to limitations and disadvantages of the related art.

Therefore, the present disclosure has been made in view of the above problems, and it is an object of the present disclosure to provide a method and apparatus for detecting an object in a three-dimensional (3D) point cloud, which automatically detect an object in a 3D model formed by three-dimensional (3D) point cloud data.

Another object of the present disclosure is to provide a method and apparatus for detecting an object in a 3D point cloud, which calculate inventory (or total stock) by measuring the volume of raw materials detected in the three-dimensional (3D) model.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In accordance with one embodiment of the present disclosure, an apparatus for detecting an object in a three-dimensional (3D) point includes a three-dimensional (3D) model reconstruction unit configured to reconstruct a three-dimensional (3D) model using three-dimensional (3D) point cloud data, a two-dimensional (2D) object detection unit configured to detect an object in at least one two-dimensional (2D) image captured to generate the three-dimensional (3D) point cloud data, a three-dimensional (3D) position estimation unit configured to form a cylinder surrounding the object in the three-dimensional (3D) model based on a two-dimensional (2D) position of the detected object so as to estimate a three-dimensional (3D) position of the detected object using the cylinder, and an object region extraction unit configured to acquire three-dimensional (3D) point cloud data contained in the cylinder so as to extract an object region from the acquired three-dimensional (3D) point cloud data.

In some implementation, the three-dimensional (3D) model reconstruction unit may estimate a position of each point in the three-dimensional (3D) model using at least one ground reference point included in the two-dimensional (2D) image.

In some implementations, the three-dimensional (3D) position estimation unit may extract planar coordinates corresponding to external appearance of the detected object from the two-dimensional (2D) image, and forms a cylinder, a bottom surface of which is set to a planar figure including the planar coordinates.

In some implementations, the cylinder may be formed to have a predetermined height or less from a ground surface.

In some implementations, the object region extraction unit may acquire three-dimensional (3D) point cloud data contained in the cylinder using a clustering algorithm.

In some implementations, the object region extraction unit may form the cylinder that has a tilted shape depending on an angle where the object is photographed.

In some implementations, the apparatus may further include an inventory calculation unit configured to analyze volume of the extracted object region and to calculate an inventory of the object based on the analyzed volume.

In some implementations, external appearance pattern information of the object including at least one of iron ore, cement, and wood may be preset in the two-dimensional (2D) object detection unit.

In accordance with another embodiment of the present disclosure, a method for detecting an object in a three-dimensional (3D) point cloud includes reconstructing a three-dimensional (3D) model using three-dimensional (3D) point cloud data, detecting an object in at least one two-dimensional (2D) image captured to generate the three-dimensional (3D) point cloud data, forming a cylinder surrounding the object in the three-dimensional (3D) model based on a two-dimensional (2D) position of the detected object, thus estimating a three-dimensional (3D) position of the detected object using the cylinder, and acquiring three-dimensional (3D) point cloud data contained in the cylinder, thus extracting an object region from the acquired three-dimensional (3D) point cloud data.

It is to be understood that both the foregoing general description and the following detailed description of the present disclosure are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Figure 1:
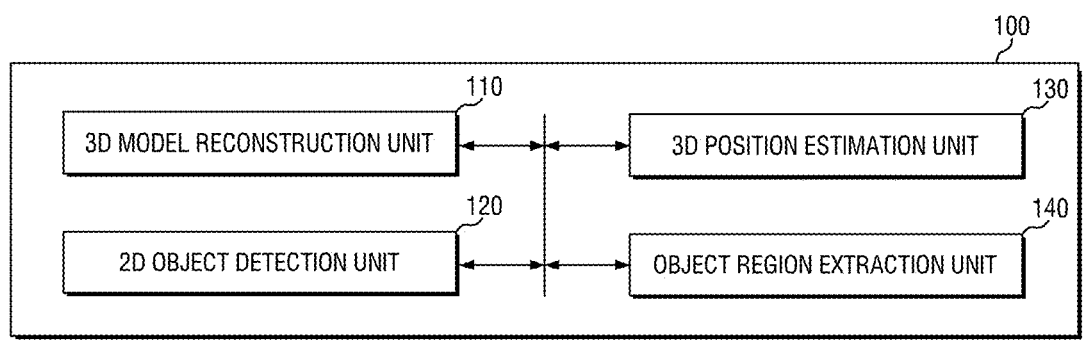
FIG. 1 is a block diagram illustrating an apparatus for detecting an object in a three-dimensional (3D) point cloud according to an embodiment of the present disclosure.

Reference will now be made in detail to the embodiments of the present disclosure, examples of which are illustrated in the accompanying drawings. Wherever possible, the same reference numbers will be used throughout the drawings to refer to the same or like parts. The present disclosure may be implemented in various different forms and is not limited to these embodiments. Although a detailed description of parts unrelated to the description will herein be omitted for clarity of the present disclosure, it should be noted that the omitted parts are not always unnecessary for implementation of devices or systems related to the technical idea of the present disclosure. In the following description, a detailed description of related known configurations or functions incorporated herein will be omitted to avoid obscuring the subject matter. In addition, the same reference numbers or symbols disclosed in the drawings of the present disclosure may represent parts or components which perform substantially the same function. For convenience of explanation, the apparatus and method of the present disclosure will be described together.

FIG. 1 is a block diagram illustrating an apparatus 100 for detecting an object in a three-dimensional (3D) point cloud according to an embodiment of the present disclosure. FIGS. 2A to 2G are diagrams illustrating examples of a method for detecting an object in a three-dimensional (3D) point cloud according to an embodiment of the present disclosure.

Referring to FIG. 1, the apparatus 100 (hereinafter referred to as an object detection apparatus 100 for convenience of description) for detecting an object in a three-dimensional (3D) point cloud according to the present disclosure may include a three-dimensional (3D) model reconstruction unit 110, a two-dimensional (2D) object detection unit 120, a three-dimensional (3D) position estimation unit 130, and an object region extraction unit 140. In some implementations, the object detection apparatus 100 for the three-dimensional (3D) point cloud may further include an inventory calculation unit (not shown).

The three-dimensional (3D) model reconstruction unit 110 may reconstruct a three-dimensional (3D) model using three-dimensional (3D) point cloud data.

The three-dimensional (3D) point cloud may be a set (or aggregate) of a plurality of points belonging to a three-dimensional (3D) coordinate system. In the three-dimensional (3D) coordinate system, the points may be defined as X coordinates, Y coordinates, and Z coordinates. The points may be distributed along an outer surface of a three-dimensional (3D) object to be represented.

Figure 2A:
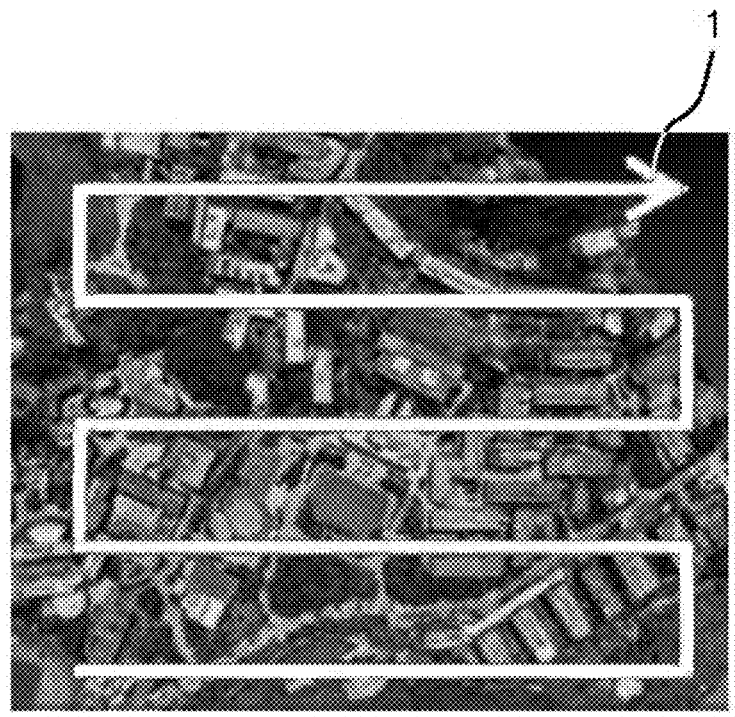
FIGS. 2A to 2G are diagrams illustrating examples of a method for detecting an object in a three-dimensional (3D) point cloud according to an embodiment of the present disclosure.

In some implementations, the 3D point cloud data may be generated using two-dimensional (2D) aerial images photographed by at least one drone equipped with a camera. For example, as shown in FIG. 2A, the drone can photograph aerial images (e.g., 2D images) while flying in the direction of an arrow 1 in the sky above a construction site where construction materials are placed. The photographed 2D image may include one or more objects. In this case, the object may include construction materials, for example, iron ore, cement, wood, etc. The drone may transmit the photographed 2D images to the object detection apparatus 100 for the 3D point cloud.

In some implementations, the 3D model reconstruction unit 110 may apply a Structure From Motion (SFM) algorithm to aerial images photographed by at least one drone equipped with a camera, may create the position of the camera through execution of the SFM algorithm, may calculate 3D positions of characteristic points, and may thus generate 3D point cloud data based on the calculated 3D positions.

In some implementations, the 3D model reconstruction unit 110 may calculate scales in units of meters (m) and square meters ($m^2$) using a GPS sensor included in the drone flying in the direction of the arrow 1, and may thus reconstruct a three-dimensional (3D) model based on the calculated scales. As a result, a user can analyze various kinds of information (e.g., length, volume, width, etc.) of a desired portion (i.e., a target object) to be measured, based on the reconstructed 3D model.

Figure 2B:
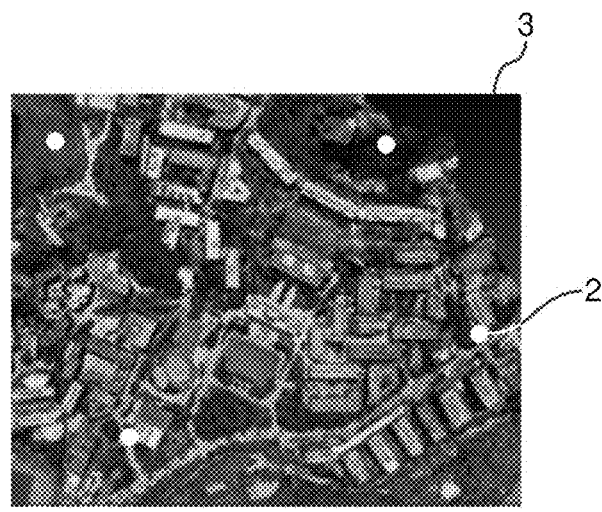

In some implementations, the 3D model reconstruction unit 110 may estimate the position of each point in the 3D model using at least one ground reference point included in the 2D image. By installing one or more ground reference points on the ground, the 3D model reconstruction unit 110 may mutually match two-dimensional (2D) images using ground reference points included in 2D images photographed at different flight altitudes, different positions, or different postures, such that the matched 2D images can be coordinated. As illustrated in FIG. 2B, a ground reference point 2 may be installed on the ground, planar coordinates required for digital photogrammetry (digital plotting) may be established through actual measurement in the field, such that the accuracy of the 3D model can be corrected.

The 3D model reconstruction unit 110 may extract a three-dimensional (3D) mesh model based on the generated 3D point cloud data. An example of the 3D mesh modeling result 3 is shown in FIG. 2B.

Figure 2C:
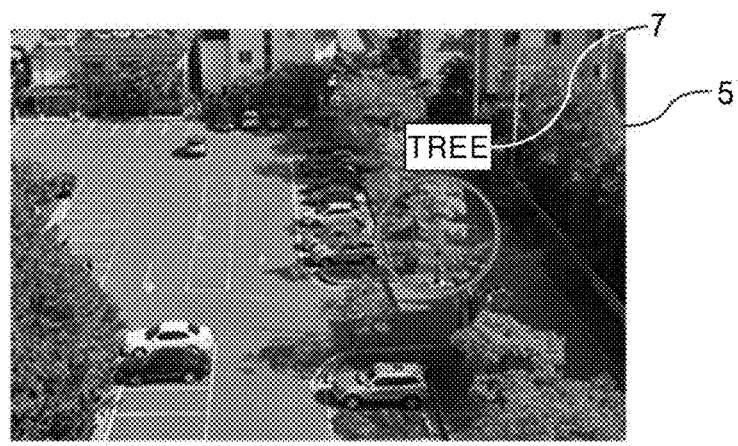

The 2D object detection unit 120 may detect an object in at least one 2D image captured to generate 3D point cloud data. Referring to FIG. 2C, the 2D object detection unit 120 may acquire a 2D image 5 from at least one drone, may detect an object in the captured 2D image 5, and may perform labeling 7 of the detected object. Although FIG. 2C is a side view illustrating the 2D image 5 for convenience of description, the scope or spirit of the present disclosure is not limited thereto, and it is possible to detect the object from 2D images captured at various viewpoints, for example, a front view, a top view, etc.

In some implementations, the 2D object detection unit 120 may detect an object in at least one 2D image acquired from the 3D model reconstructed by the 3D model reconstruction unit 110. That is, the 2D object detection unit 120 may acquire the 2D image through 2D projection of the reconstructed 3D model, may detect an object from the acquired 2D image, and may perform labeling of the detected object.

As described above, the 2D object detection unit 120 may use a two-dimensional (2D) object detection algorithm (e.g., a deep learning algorithm) to detect the object from the 2D image. A method for detecting an object from the 2D image and recognizing the type of the detected object has been well known to those skilled in the art, and as such a detailed description thereof will herein be omitted for convenience of description.

In some implementations, external appearance pattern information of the object including at least one of iron ore, cement, and wood may be preset in the 2D object detection unit 120. As will be described later, an inventory analysis unit may detect construction materials in the 3D model designed to reconstruct an image of a construction site, may calculate a volume of the construction materials, and may thus calculate an inventory based on the volume of the construction materials.

The 3D position estimation unit 130 may form a cylinder surrounding the object in the 3D model using a two-dimensional (2D) position of the object detected in at least one 2D image, and may thus estimate a three-dimensional (3D) position of the object detected in the 2D image based on the formed cylinder. A bottom surface (i.e., a surface corresponding to the ground surface) of the cylinder may be a kind of a bounding box as a specific region of the 2D image. In this case, the bounding box may refer to a region that surrounds the object in the 2D image. The cylinder may be formed in various tube shapes (e.g., a cylindrical shape, a rectangular parallelepiped shape, etc.) according to shapes of the bottom surface thereof, the scope or spirit of the present disclosure is not limited thereto, and the cylinder can also be formed in another shape, the top surface and the bottom surface of which are identical in shape to each other, formed to have a constant height. In this case, the top surface of the above shape may be smaller or equal to in size than the bottom surface. Alternatively, the cylinder may be formed in a conical shape or a quadrangular pyramid shape according to the shape of the bottom surface thereof. That is, if the bottom surface of the cylinder is formed in a circular shape, the cylinder may be formed in a conical shape. If the bottom surface of the cylinder is formed in a square or rectangular shape, the cylinder may be formed in a quadrangular pyramid shape. In this case, an upper portion of the cylinder may be formed as a single point, without being limited thereto.

The 3D position estimation unit 130 may analyze information labeled in at least one 2D image acquired from the 2D object detection unit 120, and may extract planar coordinates in the 3D model of the detected object based on the analyzed information. In more detail, the 3D position estimation unit 130 may extract external appearance of the detected object from a top-view image obtained from the 3D model, and may extract planar coordinates corresponding to the external appearance of the object.

The 3D position estimation unit 130 may form a cylinder that is formed in a manner that a planar figure including the extracted planar coordinates is set to a bottom surface of the cylinder vertically extending toward the bottom surface, in the 3D model, and may thus estimate the 3D position of the detected object based on the formed cylinder.

FIGS. 2A to 2G are diagrams illustrating examples of a method for forming the cylinder in the 3D model when a planar figure including planar coordinates of the detected object is formed in a circular shape. For convenience of description and better understanding of the present disclosure, FIGS. 2D to 2G assume that a three-dimensional (3D) object to be detected is a tree.

Figure 2D:
Figure 2E:
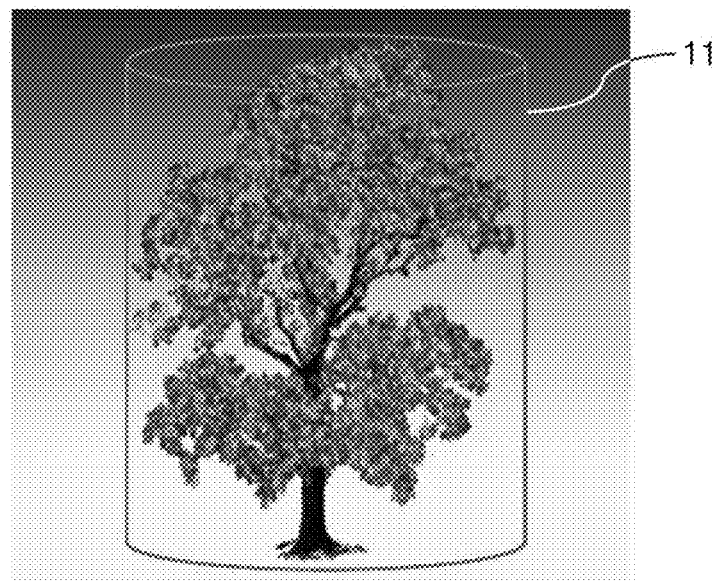

As illustrated in FIG. 2D, the planar FIG. 9 including planar coordinates of a three-dimensional (3D) model 8 of the detected object may be formed in a circular shape. As illustrated in FIG. 2E, a cylinder 11 may be formed in the 3D model 8. In this case, the cylinder 11 may be formed such that a circular shape corresponding to the planar FIG. 9 shown in FIG. 2C is determined to be a bottom surface of the cylinder 11 vertically extending toward the bottom surface. That is, the region in which the cylinder 11 is formed may be estimated to be the 3D position of the detected object.

Although FIGS. 2D to 2E illustrate that the bottom surface of the cylinder 11 is formed in a circular shape for convenience of description, the scope or spirit of the present disclosure is not limited thereto, and the bottom surface of the cylinder can also be formed in other shapes, for example, a circular shape, a rectangular shape, a polygonal shape, or another shape corresponding to external appearance of the object. That is, the shape of the bottom surface of the cylinder is not limited thereto, and the bottom surface of the cylinder can also be formed in any other shapes capable of including all kinds of objects therein. In addition, the bottom surface of the cylinder may be enlarged to a predetermined size within the range corresponding to external appearance of the object, resulting in reduction in errors. For example, whereas the outer shape of the object appearing in the 2D image is covered by the bottom surface of the cylinder, if the outer shape of the object deviates from the cylinder region in the 3D model, some parts of the object located outside the cylinder may not be extracted in the process of extracting the entire object. In this case, when the length, width, volume, etc. of the object are analyzed, the analyzed resultant data of the object may be smaller than the actual size of the object. Therefore, assuming that the bottom surface of the cylinder is formed to extend to a predetermined value so as to prevent the object from deviating from the cylinder region of the 3D model, the length, width, volume, etc. of the object can be more precisely analyzed in a subsequent process.

In some implementations, the object region extraction unit 140 may extract planar coordinates corresponding to the outline of the object detected in the 2D image, and may form a cylinder in which a planar figure corresponding to the planar coordinates is set to the bottom surface.

In some implementations, the cylinder may be formed to have a predetermined height or less from the ground surface. That is, the height of the cylinder may be set to a maximum height where the detected object can actually exist, and the cylinder may be formed to have a predetermined height from the user's location.

In some implementations, the object region extraction unit 140 may form a cylinder having a tilted shape that is inclined at an angle where the corresponding object is photographed. In this case, the inclination of the cylinder may be determined by the relative positional relationship between the object and the camera mounted to the drone 15.

Figure 2F:
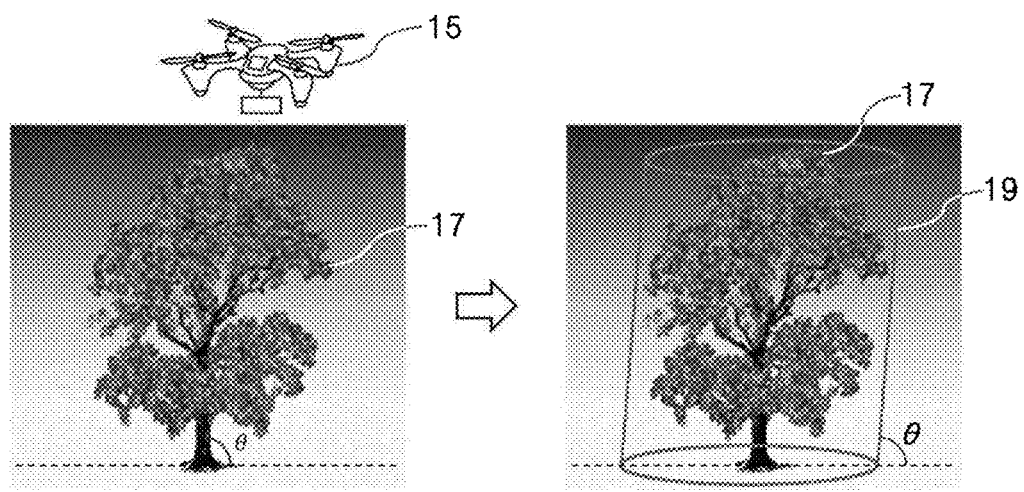

In detail, as shown in FIG. 2F, in a situation in which aerial images are photographed by the drone 15 flying in the air, if an angle between a straight line for interconnecting the drone 15 and the detected object 17 and the ground surface is denoted by 'θ', the object region extraction unit 140 may form a cylinder 19 formed to be tilted at an angle (90°-θ) in the detected object 17. That is, the angle between the outer wall of the cylinder and the ground surface may be denoted by 'θ'. In this case, considering the limit of the angle of view AOV (also called a field of view FOV) of the camera mounted to the drone 15, θ may be set to 0° to 60°, without being limited thereto. Assuming that the cylinder is formed in a tilted shape and the object is included in the cylinder, there is no restriction in extracting the object region in the aerial images captured by the drone. In order to create only the untilted cylinder, the drone 15 should perform aerial photographing based on top-view images of all objects to be photographed. If the cylinder formed to be tilted along a movement route of the drone 15 is created, the efficiency of object extraction can be maximized. As a result, the embodiments of the present disclosure can create an image of a tilted cylinder, such that the efficiency of aerial photographing can increase and the time and costs required for such aerial photographing can be minimized.

Figure 2G:
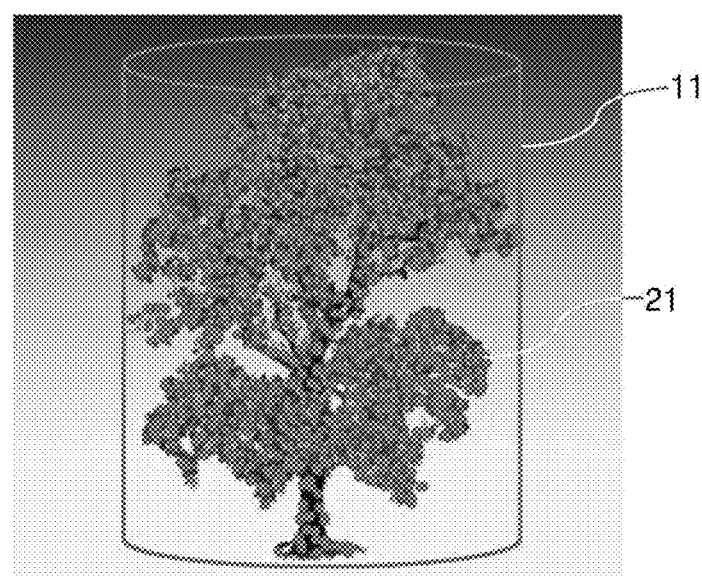

The object region extraction unit 140 may acquire three-dimensional (3D) point cloud data contained in the cylinder 11, and may thus extract the object region from the acquired 3D point cloud data. As shown in FIG. 2G, the object region extraction unit 140 may acquire the 3D point cloud data 21 contained in the cylinder 11, and may thus extract the object region from the 3D point cloud data.

In some implementations, the object region extraction unit 140 may acquire 3D point cloud data contained in the cylinder using a clustering algorithm. Since there is a possibility that the cylinder has another object but not the object detected by the 2D object detection unit 120, the 3D point cloud data is acquired using the clustering algorithm, resulting in an increase in the accuracy of object detection.

The inventory calculation unit (not shown) may analyze the volume of the object region extracted from the 3D model, and may thus calculate the inventory of the object based on the analyzed resultant data. The inventory calculation unit may analyze the length, width, volume, etc. of the object using 3D point cloud data acquired from the object region extraction unit 140.

In particular, the inventory calculation unit may detect construction materials (e.g., iron ore, cement, wood, etc.) of a construction site, may analyze volume of the corresponding construction material, and may thus generate an inventory of the corresponding construction material based on the analyzed resultant data. To this end, the inventory calculation unit may prestore data about the volume of each raw material from among the construction materials. The volume of the corresponding raw material for construction is analyzed and the inventory of the corresponding construction material is calculated based on the analyzed result. As a result, it is possible to accurately manage the inventory of the corresponding construction material, resulting in expenses for such raw materials.

Figure 3:
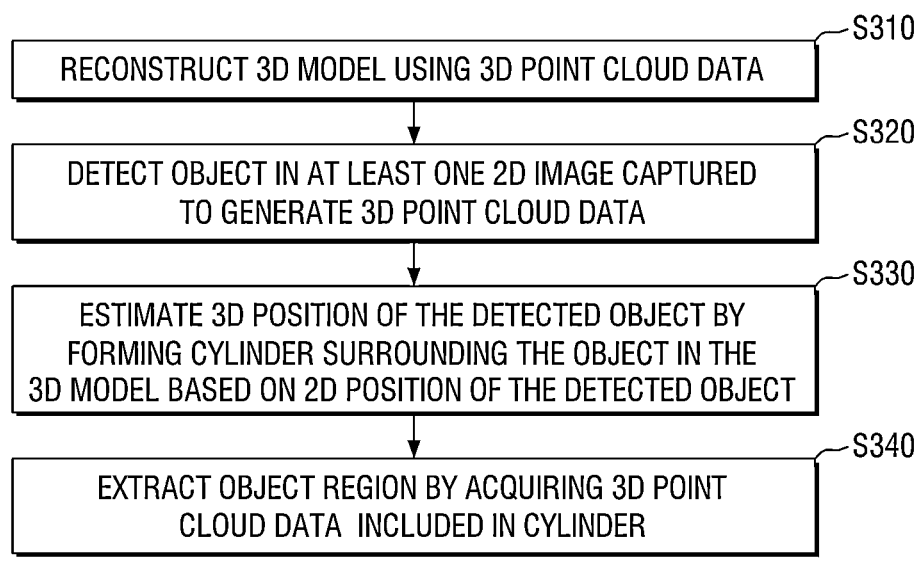
FIG. 3 is a flowchart illustrating a method for detecting an object in a three-dimensional (3D) point cloud according to an embodiment of the present disclosure.

FIG. 3 is a flowchart illustrating a method for detecting the object in a three-dimensional (3D) point cloud according to an embodiment of the present disclosure.

Referring to FIG. 3, the 3D model reconstruction unit 110 may reconstruct the 3D model using the 3D point cloud data (S310). The 3D point cloud data may be created using 2D aerial images photographed by the drone equipped with a camera.

The 2D object detection unit 120 may detect the object in at least one 2D image photographed to create the 3D point cloud data (S320). The 2D object detection unit 120 may acquire the 2D image from at least one drone, may detect the object in the acquired 2D image, and may perform labeling of the detected object.

The 3D position estimation unit 130 may form the cylinder surrounding the object within the 3D model based on the 2D position of the detected object, and may thus estimate the 3D position of the detected object using the cylinder (S330). In this case, the cylinder may be formed in various tube shapes, for example, a cylindrical shape, a rectangular parallelepiped shape, etc., without being limited thereto. If necessary, the cylinder can also be formed in another shape in which the top surface and the bottom surface are identical in shape to each other and the height corresponding to the distance between the top surface and the bottom surface is set to a predefined height.

The object region extraction unit 140 may acquire 3D point cloud data contained in the cylinder, and may thus extract the object region based on the acquired 3D point cloud data (S340). In some implementations, the object region extraction unit 140 may acquire the 3D point cloud data contained in the cylinder using the clustering algorithm.

As is apparent from the above description, the method and apparatus for detecting an object in a three-dimensional (3D) point cloud according to the embodiments of the present disclosure can automatically detect types and volume (quantity) of raw materials in a 3D model.

In addition, the method and apparatus for detecting an object in the 3D point cloud according to the embodiments of the present disclosure can calculate inventory by measuring volume of raw materials detected in the 3D model, resulting in reduction in expenses for such raw materials.

The present disclosure has been described in detail with reference to the embodiments shown in the attached drawings. The embodiments described above should be understood as being given by way of example, rather than limiting the present disclosure in all aspects. The scope of the present disclosure is defined by the following claims, rather than the above detailed description, and all modifications or alternative forms, which are induced from the scope and meaning of the claims and equivalents thereof should be construed as being included in the scope of the present disclosure. The true technical scope of the present disclosure should be defined by the technical spirit of the appended claims rather than the foregoing description. Although specific terms are used herein, these terms are merely used for the purpose of describing the concept of the present disclosure and are not used to limit the scope of the invention as set forth in the claims. The operation steps of the present disclosure need not necessarily be performed in the order described, and can be performed in parallel, selective, or individual manners. It will be appreciated by those skilled in the art that various modifications and equivalent embodiments are possible within the scope of the present disclosure as claimed in the claims. It is to be understood that the equivalents include all components currently known to perform the same function, regardless of the equivalent, i.e., structure, to be developed in the future as well as known equivalents.

What is claimed is:

1. A method for detecting an object in a three-dimensional (3D) point cloud comprising:
   by a three-dimensional (3D) model reconstruction unit, reconstructing a three-dimensional (3D) model using three-dimensional (3D) point cloud data;

by a two-dimensional (2D) object detection unit, detecting an object in at least one two-dimensional (2D) image captured to generate the three-dimensional (3D) point cloud data;

by a three-dimensional (3D) position estimation unit, extracting an external appearance of the object from a top-view image obtained from the three-dimensional (3D) model, extracting planar coordinates corresponding to the external appearance of the object, forming a cylinder surrounding the object in the three-dimensional (3D) model based on a two-dimensional (2D) position of the detected object based on the planar coordinates, and estimating a three-dimensional (3D) position of the detected object using the cylinder; and by an object region extraction unit, acquiring three-dimensional (3D) point cloud data contained in the cylinder, and extracting an object region from the acquired three-dimensional (3D) point cloud data, wherein a bottom surface of the cylinder is set to a planar figure including the planar coordinates.

2. The method according to claim 1, further comprising:
by the three-dimensional (3D) model reconstruction unit, estimating a position of each point in the three-dimensional (3D) model using at least one ground reference point included in the two-dimensional (2D) image.

3. The method according to claim 1, wherein:
the cylinder is formed to have a predetermined height or less from a ground surface.

4. The method according to claim 1, further comprising:
by the object region extraction unit, acquiring three-dimensional (3D) point cloud data contained in the cylinder using a clustering algorithm.

5. The method according to claim 1, further comprising:
by the object region extraction unit, forming the cylinder that has a tilted shape depending on an angle where the object is photographed.

6. The method according to claim 1, further comprising:
by an inventory calculation unit, analyzing a volume of the extracted object region and to calculate an inventory of the object based on the analyzed volume.

7. The method according to claim 1, wherein:
external appearance pattern information of the object including at least one of iron ore, cement, and wood is preset in the two-dimensional (2D) object detection unit.

* * * * *